(12) United States Patent
Brueckner et al.

(10) Patent No.: US 9,006,983 B1
(45) Date of Patent: Apr. 14, 2015

(54) SYSTEM AND METHOD FOR DETECTING THE SOURCE OF GLARE IN IMAGERY

(75) Inventors: Peter Gregory Brueckner, Santa Cruz, CA (US); Matthew Thomas Valente, Mountain View, CA (US)

(73) Assignee: Google Inc., Mountain View, CA (US)

( * ) Notice: Subject to any disclaimer, the term of this patent is extended or adjusted under 35 U.S.C. 154(b) by 689 days.

(21) Appl. No.: 13/402,122

(22) Filed: Feb. 22, 2012

(51) Int. Cl.
*H05B 37/02* (2006.01)
*G01J 1/42* (2006.01)
*G01J 1/16* (2006.01)

(52) U.S. Cl.
CPC . *G01J 1/4228* (2013.01); *G01J 1/16* (2013.01)

(58) Field of Classification Search
USPC ............... 315/149, 151, 153, 154; 359/601
See application file for complete search history.

(56) References Cited

U.S. PATENT DOCUMENTS

| | | | |
|---|---|---|---|
| 6,088,541 A | 7/2000 | Meyer | |
| 2007/0012869 A1* | 1/2007 | Mullin et al. | 250/214 R |
| 2009/0273843 A1 | 11/2009 | Raskar et al. | |
| 2010/0147948 A1* | 6/2010 | Powell et al. | 235/455 |
| 2011/0286682 A1 | 11/2011 | Banner et al. | |

* cited by examiner

*Primary Examiner* — William Hernandez
(74) *Attorney, Agent, or Firm* — Dority & Manning, P.A.

(57) ABSTRACT

One exemplary implementation of the present disclosure is directed to a lighting system for detecting the source of glare in imagery. The lighting system includes a first illumination light and a second illumination light each having an associated signal light. Each illumination light is configured to be illuminated independent of the other illumination light and both signal lights. Each signal light has a different spectral peak from the other signal light. The lighting system further includes a control system configured to control the illumination of the first and second illumination lights and associated signal lights based at least in part on identified glare.

19 Claims, 3 Drawing Sheets

SYSTEM AND METHOD FOR DETECTING THE SOURCE OF GLARE IN IMAGERY

FIELD

The present disclosure relates to lighting systems for detecting sources of glare in imagery and methods related thereto.

BACKGROUND

Very high resolution images can be used to depict various objects or locations in intricate detail for observation by interested parties. For instance, the Google Art Project services provided by Google, Inc. provide access to very high resolution images of various works of art from worldwide galleries.

Lighting can be used to illuminate the subjects of such imagery. When capturing very high resolution imagery of artwork and, in particular, paintings, it becomes necessary to use controlled, consistent, and bright lighting. An array of lights situated around artwork can provide an evenly lit target. By adding artificial light during image acquisition, camera systems can use shorter exposure times, smaller apertures, and less sensor gain while still capturing enough detail to produce sharp images. Moreover, lighting can enhance surface detail by illuminating surfaces of the subject.

However, lighting has limitations due to specular reflections from such light. Artwork, particularly paintings, can include reflective paints as well irregular surfaces due to brushstrokes that can reflect light. As a result, specular reflected light is incident on the light sensitive nodes of the camera sensor resulting in glare spots within the final image. Such glare spots can effectively mask certain features of the artwork in the captured imagery.

SUMMARY

Aspects and advantages of the invention will be set forth in part in the following description, or may be obvious from the description, or may be learned through practice of the invention.

A need exists for a lighting system that can address the shortcomings of conventional equipment as it relates to lighting high resolution imagery, such as artwork. Methods for capturing high resolution imagery utilizing such lighting systems would be particularly beneficial.

One exemplary implementation of the present disclosure is directed to a lighting system for detecting the source of glare in imagery. The lighting system includes a first illumination light and a second illumination light each having an associated signal light. Each illumination light is configured to be illuminated independent of the other illumination light and both signal lights. Each signal light has a different spectral peak from the other signal light. The lighting system further includes a control system configured to control the illumination of the first and second illumination lights and associated signal lights based at least in part on identified glare.

Another exemplary implementation of the present disclosure is directed to a method for detecting the source of glare in imagery. The method includes activating at least two illumination lights to light an object, each illumination light having a signal light associated therewith, wherein each signal light has a different spectral peak from the other signal light. Signal lights to light the object are activated and a spectral peak of light reflected is determined from the object to identify a signal light source of such light.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
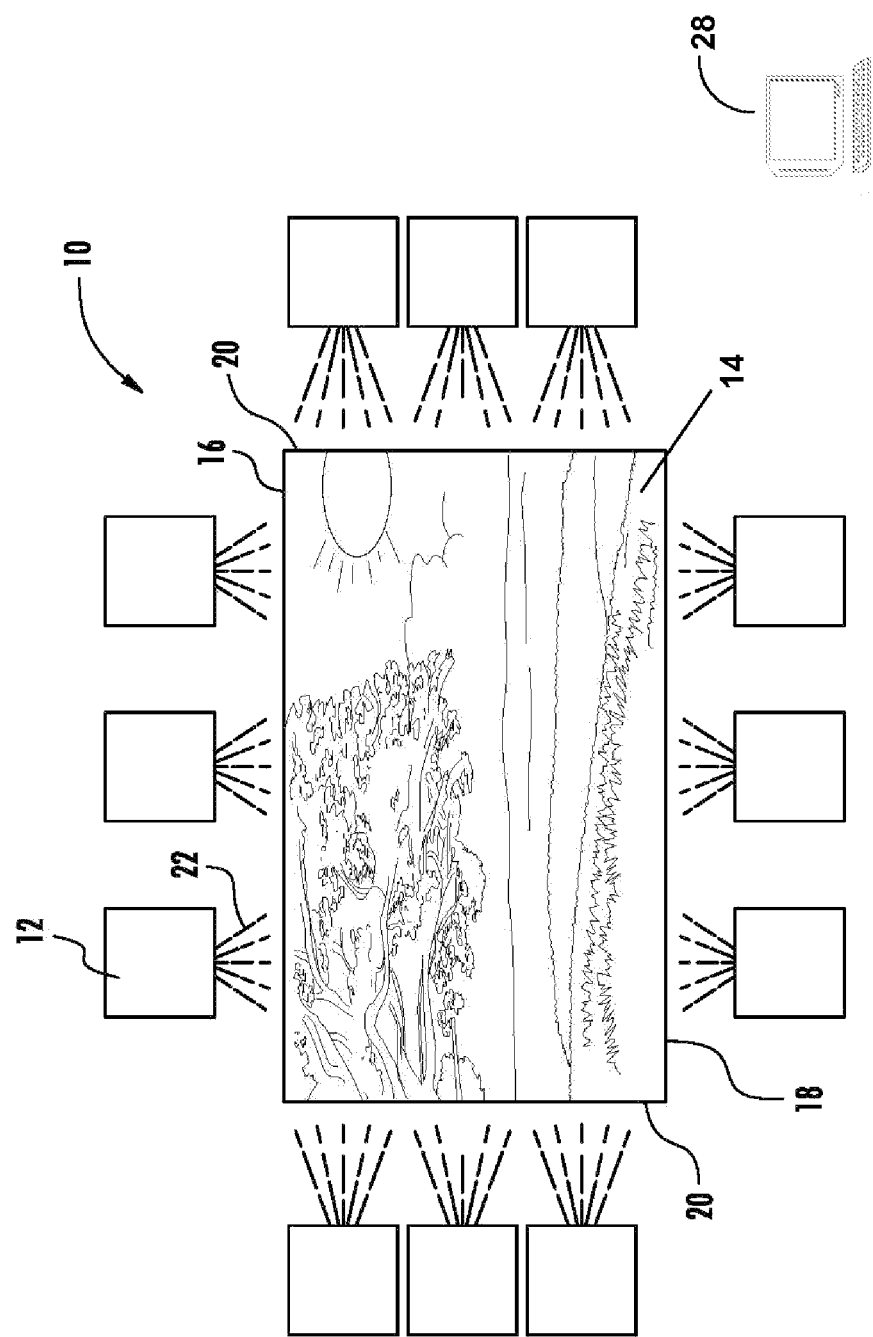
FIG. 1 depicts a lighting system according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to a lighting system that allows for efficient detection of the source of glare in imagery. When capturing imagery and, in particular, very high resolution imagery, it can sometimes be necessary to use lighting to illuminate the subject of such imagery. The present disclosure contemplates illumination lighting utilized for illumination paired with signal lighting having narrow spectral peaks which allows for identification of the source of glare in imagery. When an instance of glare occurs in the scene the camera is viewing, the unique color peaks from the signal lighting are also reflected. Based on the color of light seen in the region of glare, it is possible to determine which of the signal lights generated the color and, associate such signal light(s) with illumination light(s) that is causing the glare. Beneficially, the lighting system of the present disclosure allows for both detection and mitigation of the source of glare since the identified illumination lighting can be deactivated or dimmed while the remaining illumination lighting that is not identified as being responsible for glare can stay activated.

In certain aspects of the present disclosure, the lighting system is used in connection with a camera capable of acquiring very high resolution imagery. Any suitable camera configured to acquire very high resolution imagery is contemplated for use with the present disclosure. As used herein, "very high resolution imagery" refers to imagery having a resolution of at least one gigapixel (one billion pixels). In this regard, commercially available robotic mounts can be utilized in connection with conventional megapixel digital cameras to capture high resolution imagery. The robotic mount can automate the image acquisition process, triggering the camera to precisely capture images across a grid. Such images can be stitched into a single very high resolution image using conventional software. The software can be present on the camera or can be external to the camera on a processing device in communication with the camera, such as an electronic control system as will be further described herein.

In certain configurations, the camera can include an array of megapixel sensors and a ball lens to acquire imagery that undergoes post-capture image processing to produce very high resolution imagery.

Referring to FIG. 1, an exemplary lighting system 10 in accordance with the present disclosure is illustrated. The lighting system 10 includes separate light panels 12. As illustrated, twelve separate light panels 12 are present. However, it should be understood that any suitable number of light panels can be utilized in any suitable arrangement in connection with the present disclosure. In addition, two or more light panels can be joined together to form a single light panel unit (not shown) if desired.

The light panels 12 are positioned around an object represented by artwork 14. However, the lighting system of the present disclosure can be used to illuminate any object that requires illumination for proper image capture. Three light panels 12 are positioned above the top portion 16 of artwork 14, three light panels 12 are positioned below the bottom portion 18 of artwork 14, and three light panels 12 are positioned at each side portion 20 of artwork 14. Again, however, any suitable number of light panels in any suitable arrangement is contemplated by the present disclosure. Each light panel emits light 22 when activated as will be described in further detail herein.

Figure 2:
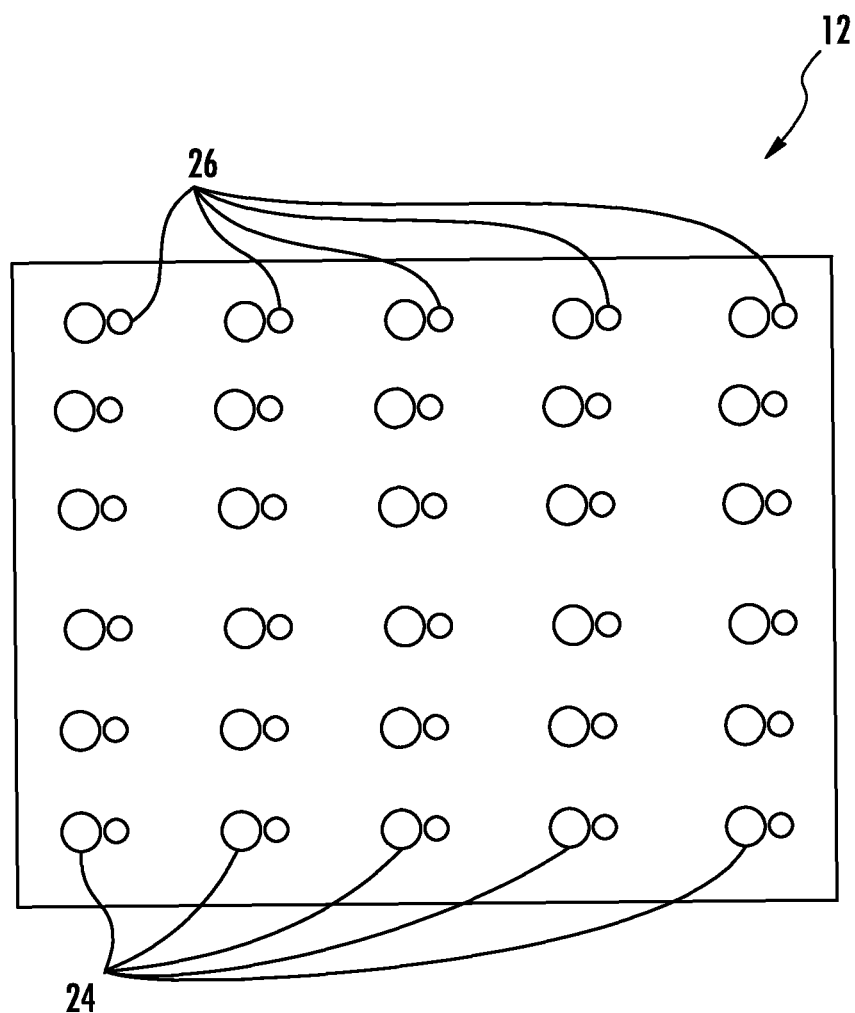
FIG. 2 depicts a light panel according to an exemplary embodiment of the present disclosure.

Referring to FIG. 2, an exemplary light panel 12 in accordance with the present disclosure is illustrated. The light panel 12 includes illumination lights 24 and signal lights 26. Each illumination light 24 has an associated signal light 26 that is located adjacent to the illumination light 24. In this regard, the signal light 26 should be positioned such that light emanating from the signal light 26 and reflected from an object will be proximate to light emanating from an associated illumination light 24 and reflected from an object to cause glare.

While not illustrated, it should be appreciated that two or more illumination lights 24 can share a single associated signal light 26. Also, while FIG. 2 depicts thirty illumination lights 24 and thirty signal lights 26 associated therewith, any suitable number of illumination lights and signal lights can be present on a light panel, such as one illumination light and one associated signal light, or several illumination lights surrounded by several signal lights.

Illumination lights 24 can be any suitable light as would be known to one of ordinary skill in the art to illuminate an object for imagery capture. As illustrated, illumination lights 24 are light emitting diodes (LEDs). However, illumination lights 24 could be incandescent lamps, halogen bulbs, fluorescent lamps, compact fluorescent lamps (CFL), cold cathode fluorescent lamps (CCFL), high-intensity discharge lamps or the like.

Illumination lights 24 can have a color temperature ranging from about 5000 K to 6000 K, more particular about 5600 K. The illumination lights 24 can emit white light when activated and can have wavelengths ranging from about 400 nm to about 750 nm.

Signal lights 26 can be any suitable light having a known spectral peak with a specific color peak as would be known to one of ordinary skill in the art. As illustrated, signal lights 26 are LEDs. However, any suitable type of light having a known specific color peak that is distinguishable from white light or whatever other light source is chosen for the illumination light can be utilized.

Each signal light 26 can have a wavelength ranging from about 400 nm to about 750 nm. Each signal light 26 can generate light having a color selected from red color, orange color, yellow color, green color, cyan color, blue color, violet color, or combinations thereof. In an exemplary embodiment of the present disclosure, signal lights 26 that are present on the same light panel 12 can have identical spectral peaks to one another but different spectral peaks from signal lights 26 on any other light panel 12 of lighting system 10 (shown in FIG. 1).

As discussed above, signal lights 26 are activated to identify the one or more illumination lights 24 causing glare. In this regard, when illumination lights are activated and an instance of glare occurs in the scene that the camera is viewing, deactivation or dimming of the illumination lights and activation of the signal lights results in a reflected unique color peak from one or more signal lights 26. Illumination lights can either be deactivated or dimmed based upon the intensity of such illumination lights and the ability to detect the signal lights in the glare caused by the illumination lights. Based on the color of light that is seen in the region of glare, it is possible to determine which signal light 26 generated the light in the region of glare and which associated illumination light 24 is causing the glare.

Referring again to FIG. 1, in some implementations of the present disclosure, the lighting system 10 can be in communication with a camera system (not shown). In this manner, each illumination light and each signal light can be independently activated and deactivated or dimmed in response to image capture. The choice of whether to deactivate the light altogether or dim the light can be made based, in part, on the severity of the glare in an image. If the lighting system is acting as a conventional flash, the illumination lights can be triggered by camera system in a manner as would be known to one of ordinary skill in the art when an image is being captured. If glare is detected, another image can be captured with only the signal lights activated or with one or more of the illumination lights dimmed. In this manner, the one or more illumination lights responsible for glare can be determined and deactivated or dimmed in subsequent image captures.

In certain aspects of the present disclosure, the illumination lights of the lighting system can remain activated and provide continuous lighting. When glare is detected through the camera system, the illumination lights can be deactivated or dimmed and the signal lights can be activated to determine the source of such glare so that the responsible illumination lights can remain deactivated or dimmed as necessary in subsequent image captures.

Lighting system 10 can also be in wired or wireless communication with an electronic control system 28. Electronic control system 28 can be any suitable controller such as a processor, microcontroller, or other suitable control circuit. Controller can perform software routines in accordance with instructions and data stored in association therewith in memory. For instance, controller can be part of a general purpose computer. Electronic control system 28 can activate illumination and deactivate illumination individually for each illumination light and/or each signal light.

In certain aspects of the present disclosure, electronic control system 28 can automatically detect glare that is present in imagery taken by camera system when the illumination lights are activated and can automatically retake images with signal lights activated and illumination lights deactivated or dimmed to determine the source of such glare. The electronic control system 28 can have the arrangement of illumination lights and associated signal lights stored in memory as well as the unique spectral peaks of each signal light retained in memory as well. In this manner, the electronic control system 28 can perform color matching in the regions of glare to determine the signal light source of such light and, through association, the illumination light source(s) of the regions of glare. In this regard, any conventional method as would be known to one of ordinary skill in the art for determination of glare can be utilized by electronic control system.

Figure 3:
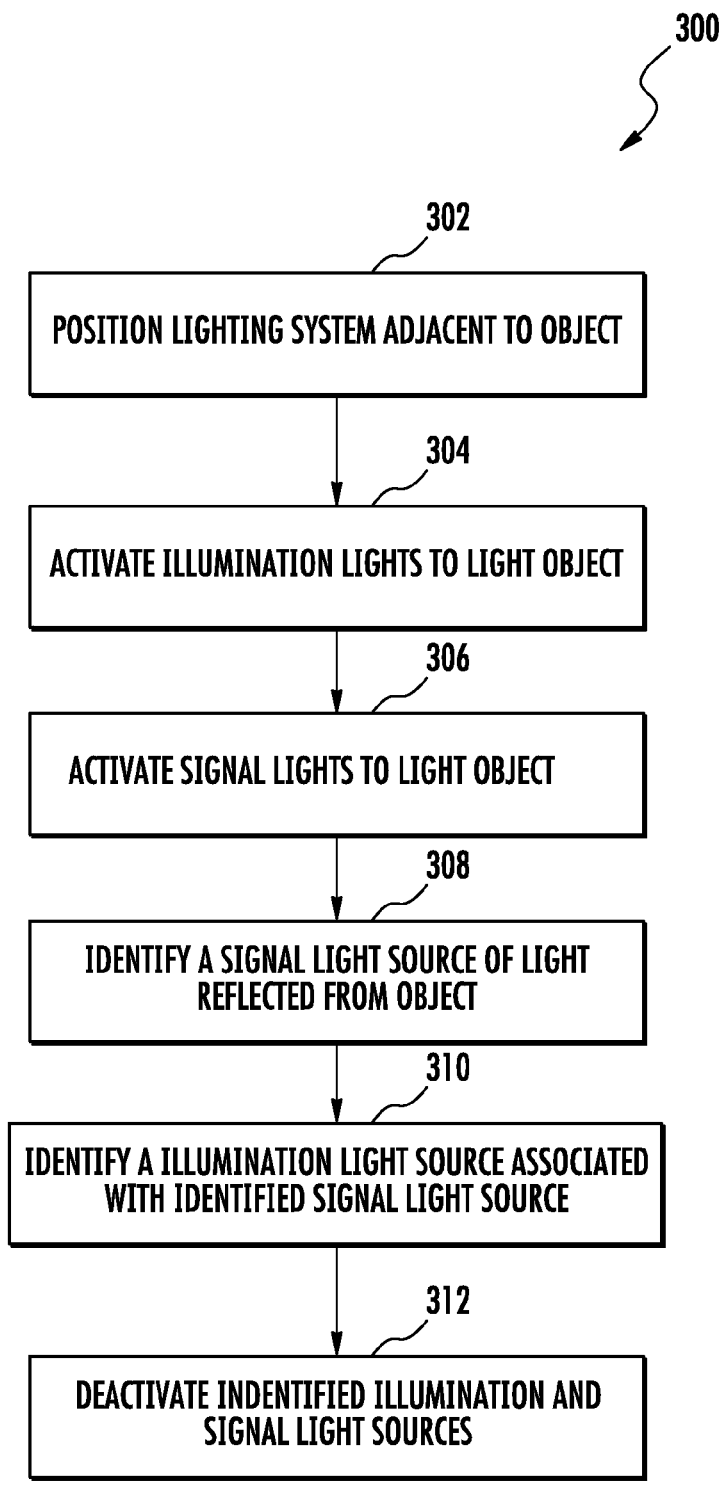
FIG. 3 depicts a flow diagram of an exemplary method according to an exemplary embodiment of the present disclosure.

FIG. 3 depicts a flow chart of an exemplary method 300 for detecting the source of glare in imagery according to an exemplary embodiment of the present disclosure. While the method 300 will be discussed with reference to the lighting system 10 of FIG. 1 and the light panel 12 of FIG. 2, those of ordinary skill in the art will understand that the exemplary method can be performed by other suitable lighting systems in accordance with the present disclosure.

At (302), the lighting system is positioned adjacent to object. For instance, referring again to FIG. 1, the lighting system 10 is positioned so as to have an array of lights around the artwork 14 in a manner that provides even lighting to the artwork 14. In particular, two or more light panels 12 having illumination lights 24 and signal lights 26 can be positioned around artwork 14 to suitably light artwork 14.

Turning back to FIG. 3, at (304), the method activates the illumination lights to light an object. A camera system can be utilized to capture imagery of the object after the illumination lights light the object and a determination can be made if glare exists in the imagery. If glare exists, at (306) the method includes activating the signal lights to light the object. Optionally, illumination lights can be deactivated or dimmed prior to activating signal lights.

Again, a camera system can capture imagery of the object after the signal lights light the object. The imagery can be used to determine a spectral peak of light in the region of glare and to identify a signal light source for such light reflected from the object (308).

Based on the identified signal light source, the illumination light source associated with the signal light source can also be identified at (310). In certain aspects of the present disclosure, more than one signal light source is identified from the unique spectral peaks (colors) associated therewith, indicating that more than one illumination light source is responsible for glare.

At (312), the method deactivates or dims the identified illumination and signal light sources (to the extent the illumination light source wasn't already deactivated or dimmed prior to the signal light source being activated) so that the camera system can resume image capture with the remaining illumination lights of camera system activated while the illumination lights responsible for glare are deactivated or dimmed.

The method described herein can be accomplished by a user visually identifying glare manually or by a control system as further described herein automatically identifying glare. In either implementation, a control system can be utilized to activate and deactivate or dim illumination and/or signal lights as needed or such lights can be manually activated and deactivated or dimmed.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A lighting system for detecting the source of glare in imagery, the lighting system comprising:
    a first illumination light and a second illumination light each having an associated signal light, each illumination light configured to be illuminated independent of the other illumination light and both signal lights, wherein each signal light has a different spectral peak from the other signal light; and
    a control system configured to control the illumination of the first and second illumination lights and associated signal lights based at least in part on identified glare.

2. The system of claim 1, wherein at least one of the first illumination light and the second illumination light comprises an LED.

3. The system of claim 1, wherein at least one of the first illumination light and the second illumination light is operable to emit light having a color temperature of from about 5000 Kelvin to about 6000 K.

4. The system of claim 1, wherein at least one of the first illumination light and the second illumination light is operable to emit light having a color temperature of about 5600 K.

5. The system of claim 1, wherein at least one of the first illumination light and the second illumination light is operable to emit white light.

6. The system of claim 1, wherein at least one of the first illumination light and the second illumination light is operable to emit light having wavelengths ranging from about 400 nm to about 750 nm.

7. The system of claim 1, wherein at least one of the signal lights comprises an LED.

8. The system of claim 1, wherein at least one of the signal lights is operable to emit light having a wavelength ranging from about 400 nm to about 750 nm.

9. The system of claim 1, wherein the signal lights are each operable to emit light having a red color, orange color, yellow color, green color, cyan color, blue color, violet color, or combinations thereof, and wherein each signal light is operable to emit light having a different color from the other signal light.

10. The system of claim 1, wherein the first illumination light and the second illumination light are in communication with a camera.

11. The system of claim 10, wherein the camera is configured to capture images for very high resolution imagery.

12. The system of claim 1, wherein the control system is capable of activating illumination and deactivating illumination individually for each illumination light.

13. The system of claim 12, wherein the control system is capable of activating illumination and deactivating illumination individually for each signal light.

14. A method for detecting the source of glare in an object comprising:
    activating at least two illumination lights to light an object, each illumination light having a signal light associated therewith, wherein each signal light has a different spectral peak from the other signal light;
    activating the signal lights to light the object; and
    determining a spectral peak of light reflected from the object to identify a signal light source of such light.

15. The method of claim 14, further comprising:
    identifying the illumination light associated with the identified signal light source.

16. The method of claim 15, further comprising:
deactivating the identified illumination light and the identified signal light.

17. The method of claim 14, wherein at least one of the illumination lights comprises an LED.

18. The method of claim 14, wherein at least one of the signal lights comprises an LED.

19. The method of claim 14, wherein the signal lights are each operable to emit light having a red color, orange color, yellow color, green color, cyan color, blue color, violet color, or combinations thereof, and wherein each signal light is operable to emit light having a different color from other signal lights.

\* \* \* \* \*